(12) United States Patent
Takeuchi (10) Patent No.: US 12,424,366 B2
(45) Date of Patent: Sep. 23, 2025

(54) MAGNET ARRANGEMENT METHOD, METHOD FOR MANUFACTURING ROTOR, MAGNET ARRANGEMENT JIG, AND MAGNET INDUCTION APPARATUS

(71) Applicant: TOYOTA JIDOSHA KABUSHIKI KAISHA, Toyota (JP)

(72) Inventor: Yushi Takeuchi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 18/550,822

(22) PCT Filed: Feb. 2, 2022

(86) PCT No.: PCT/JP2022/003940
§ 371 (c)(1),
(2) Date: Sep. 15, 2023

(87) PCT Pub. No.: WO2022/196148
PCT Pub. Date: Sep. 22, 2022

(65) Prior Publication Data
US 2024/0171051 A1    May 23, 2024

(30) Foreign Application Priority Data
Mar. 18, 2021   (JP) ................. 2021-044583

(51) Int. Cl.
*H01F 7/02*   (2006.01)
*H02K 15/03*   (2025.01)

(52) U.S. Cl.
CPC ........... *H01F 7/0247* (2013.01); *H02K 15/03* (2013.01)

(58) Field of Classification Search
CPC ...... H02K 15/03; H01F 7/0247; H01F 13/003
See application file for complete search history.

(56) References Cited

U.S. PATENT DOCUMENTS 8,823,234 B2 *   9/2014   Ortt ................ H02K 1/17
                                              310/154.29
2010/0277025 A1   11/2010   Doi et al.

FOREIGN PATENT DOCUMENTS

| JP | 2007110822 A * | 4/2007 |
| JP | 2010-200518 A | 9/2010 |

(Continued)

OTHER PUBLICATIONS

International Search Report issued Apr. 26, 2022 in PCT/JP2022/003940 filed on Feb. 2, 2022 2 pages.

*Primary Examiner* — Mohamad A Musleh
(74) *Attorney, Agent, or Firm* — Oblon, McClelland, Maier & Neustadt, L.L.P.

(57) ABSTRACT

A magnet arrangement method capable of arranging magnetized magnets accurately at determined positions is provided. In the magnet arrangement method, in a state where a magnetized magnet to be newly arranged is attracted to a magnet arrangement jig, the magnetized magnet to be newly arranged is moved in an axial center direction of a magnetic flux loop of the magnetized magnet to be newly arranged so that the magnetic flux loop of the magnetized magnet to be newly arranged overlaps a magnetic flux loop of a magnetized magnet that has already been arranged in the magnet arrangement jig, whereby the magnetized magnet to be newly arranged is positioned so as to be adjacent to the already arranged magnetized magnet.

7 Claims, 11 Drawing Sheets

(56) References Cited

FOREIGN PATENT DOCUMENTS

| | | |
|---|---|---|
| JP | 2012-217278 A | 11/2012 |
| JP | 2018-107929 A | 7/2018 |
| KR | 10-2017-0057011 A | 5/2017 |

* cited by examiner

MAGNET ARRANGEMENT METHOD, METHOD FOR MANUFACTURING ROTOR, MAGNET ARRANGEMENT JIG, AND MAGNET INDUCTION APPARATUS

TECHNICAL FIELD

The present disclosure relates to a magnet arrangement method, a method for manufacturing a rotor, a magnet arrangement jig, and a magnet induction apparatus.

BACKGROUND ART

When magnets are arranged on a rotor core or the like and then the magnets are magnetized, the magnets may not be magnetized accurately. Therefore, magnets that have been magnetized in advance (i.e., magnetized magnets) are arranged on a rotor core or the like and fixed to the rotor core. For example, in Patent Literature 1, a magnet unit in which a plurality of magnetized magnets are fixed using epoxy resin to a plate made of a thin iron sheet is wound around a rotor core. Further, in Patent Literature 2, a main magnetic pole permanent magnet and a sub-magnetic pole permanent magnet are fixed to a back yoke by using projections and recesses of the back yoke.

CITATION LIST

Patent Literature

Patent Literature 1: Japanese Unexamined Patent Application Publication No. 2018-107929
Patent Literature 2: Japanese Unexamined Patent Application Publication No. 2007-110822

SUMMARY OF INVENTION

Technical Problem

The applicant has found the following problem. When magnetized magnets are arranged, it is difficult to arrange the magnetized magnets accurately at determined positions since attraction and repulsive forces are generated between adjacent magnetized magnets.

The present disclosure has been made in view of the above-described problem and provides a magnet arrangement method, a method for manufacturing a rotor, a magnet arrangement jig, and a magnet induction apparatus that are capable of arranging magnetized magnets accurately at determined positions.

Solution to Problem

A magnet arrangement method according to one aspect of the present disclosure is a method for arranging a plurality of magnetized magnets, the magnet arrangement method including an arrangement process of arranging the plurality of magnetized magnets in a magnet arrangement jig composed of a magnetic material,
in which in the arrangement process, in a state where a magnetized magnet to be newly arranged is brought into contact with the magnet arrangement jig so as to be attracted to the magnet arrangement jig, the magnetized magnet to be newly arranged is moved in an axial center direction of a magnetic flux loop of the magnetized magnet to be newly arranged so that the magnetic flux loop of the magnetized magnet to be newly arranged overlaps a magnetic flux loop of a magnetized magnet that has already been arranged in the magnet arrangement jig, whereby the magnetized magnet to be newly arranged is positioned so as to be adjacent to the already arranged magnetized magnet.

It is preferable that, in the above-described magnet arrangement method,
groove parts be formed in the magnet arrangement jig, and
the magnetized magnet to be newly arranged be arranged so that the groove parts are disposed at boundary parts of the magnetized magnets adjacent to each other when the magnetized magnets are arranged.

A method for manufacturing a rotor according to one aspect of the present disclosure includes the above-described magnet arrangement method.

A magnet arrangement jig according to one aspect of the present disclosure is a magnet arrangement jig used to arrange magnetized magnets, the magnet arrangement jig including a first jig composed of a magnetic material, in which
the magnetized magnets are arranged on a surface of the first jig, the surface of the first jig including groove parts disposed at boundary parts of the magnetized magnets adjacent to each other when the magnetized magnets are arranged, and
the magnet arrangement jig includes, on a side of one end part of the magnet arrangement jig in a direction in which the groove parts are extended, an insertion part into which the magnetized magnets are inserted in order to arrange the magnetized magnets on the surface of the first jig.

It is preferable that the above-described magnet arrangement jig include a second jig composed of a magnetic material, in which
the second jig be disposed on a side of an other end part of the first jig in a direction in which the groove parts are extended relative to the first jig, and
the second jig protrude from a surface on a side of the first jig where the groove parts are formed so that the second jig comes into contact with end parts of the magnetized magnets on an insertion direction side of the magnetized magnets.

A magnet induction apparatus according to one aspect of the present disclosure is an apparatus for inducing a magnetized magnet, the magnet induction apparatus including:
a guide part configured to guide the magnetized magnet;
induction magnets configured to induce the magnetized magnet by a magnetic force; and
a pushing part configured to push the magnetized magnet in an axial center direction of a magnetic flux loop of the magnetized magnet so that the magnetic flux loop of the magnetized magnet overlaps magnetic flux loops of the induction magnets.

It is preferable that, in the above-described magnet induction apparatus, the induction magnets be disposed on both sides of the guide part when viewed in a direction in which the magnetized magnet is pushed.

Advantageous Effects of Invention

According to the present disclosure, it is possible to provide a magnet arrangement method, a method for manufacturing a rotor, a magnet arrangement jig, and a magnet induction apparatus that are capable of arranging magnetized magnets accurately at determined positions.

DESCRIPTION OF EMBODIMENTS

Specific embodiments to which the present disclosure is applied will be described hereinafter in detail with reference to the drawings. However, the present disclosure is not limited to the following embodiments. Further, for the clarification of the description, the following descriptions and the drawings are simplified as appropriate.

First Embodiment

First, a magnetized magnet and a magnet arrangement jig used in a magnet arrangement method according to this embodiment will be described. Note that the following description will be given using a three-dimensional (XYZ) coordinate system for the sake of clarity of the description.

Figure 1:
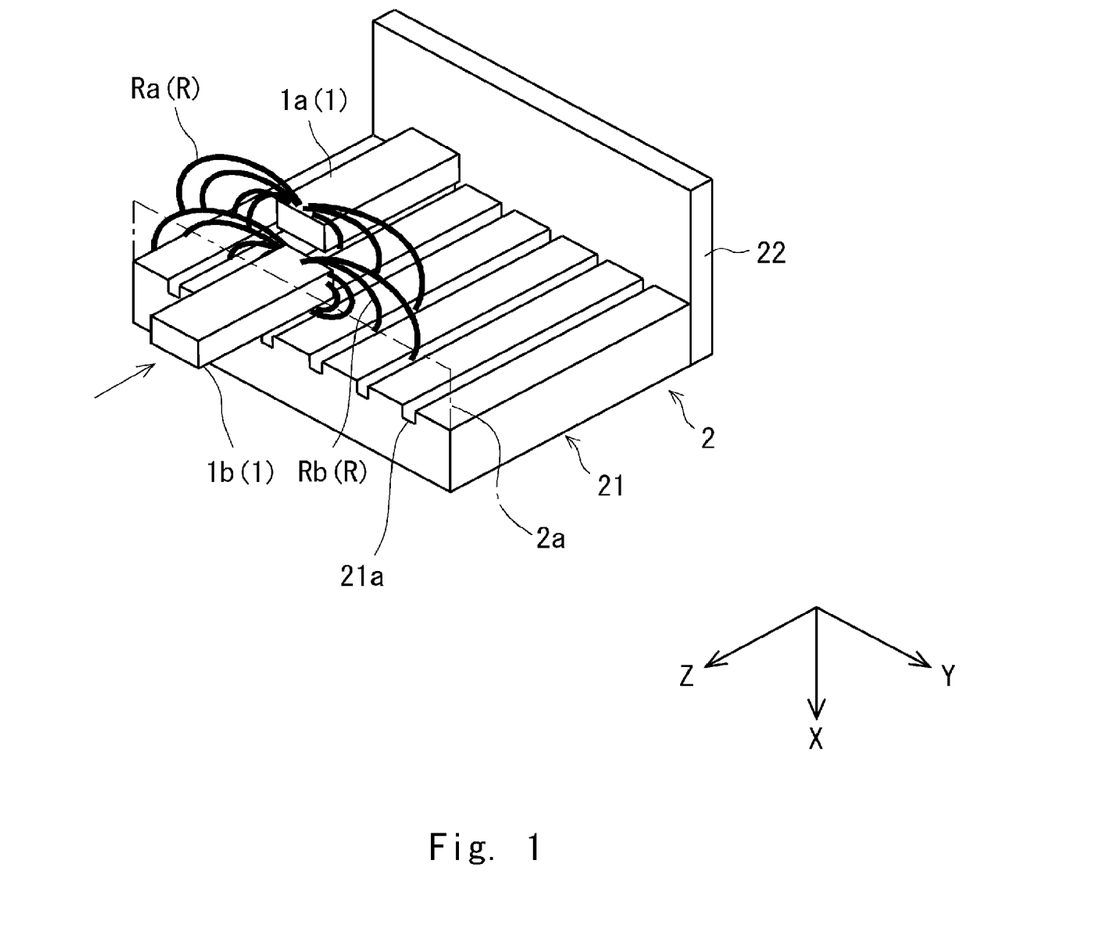
FIG. 1 is a perspective view showing a state in which a magnetized magnet to be newly arranged is being arranged on a magnet arrangement jig by a magnet arrangement method according to a first embodiment.
Figure 2:
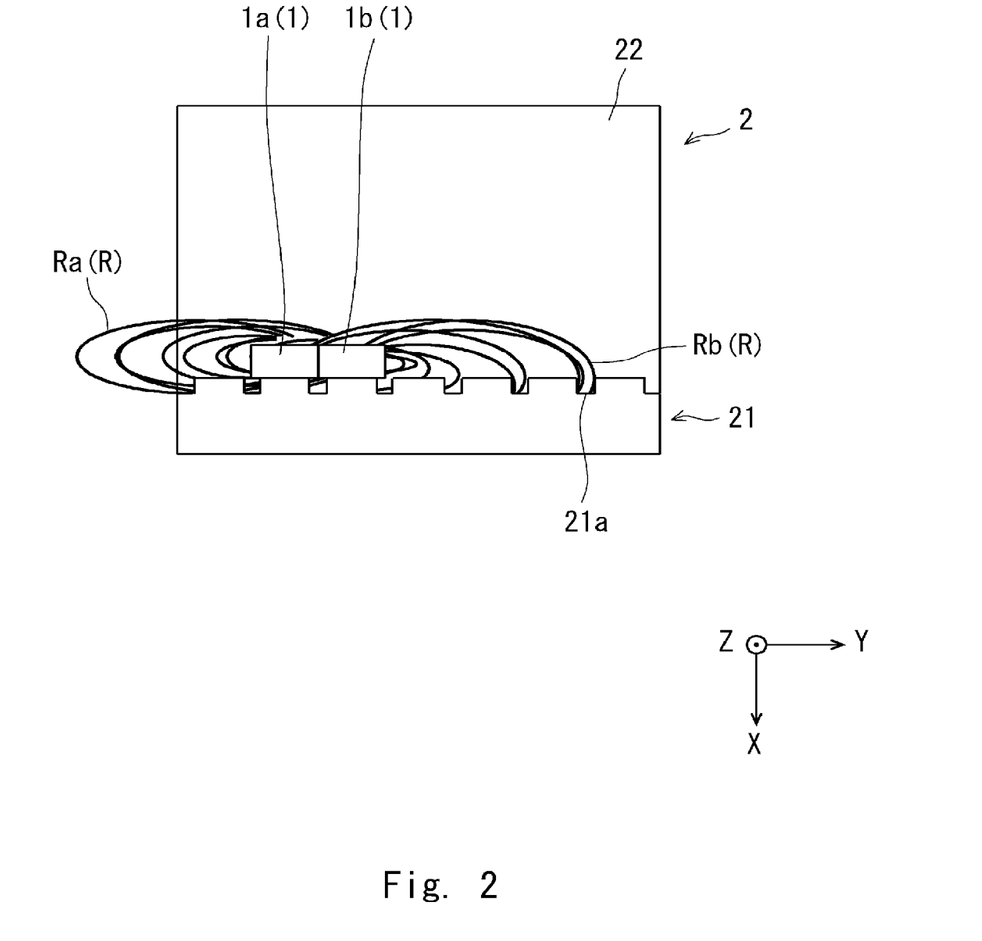
FIG. 2 is a diagram showing a state in which the magnetized magnet to be newly arranged has been arranged on the magnet arrangement jig by the magnet arrangement method according to the first embodiment as viewed from the Z-axis positive side.
Figure 3:
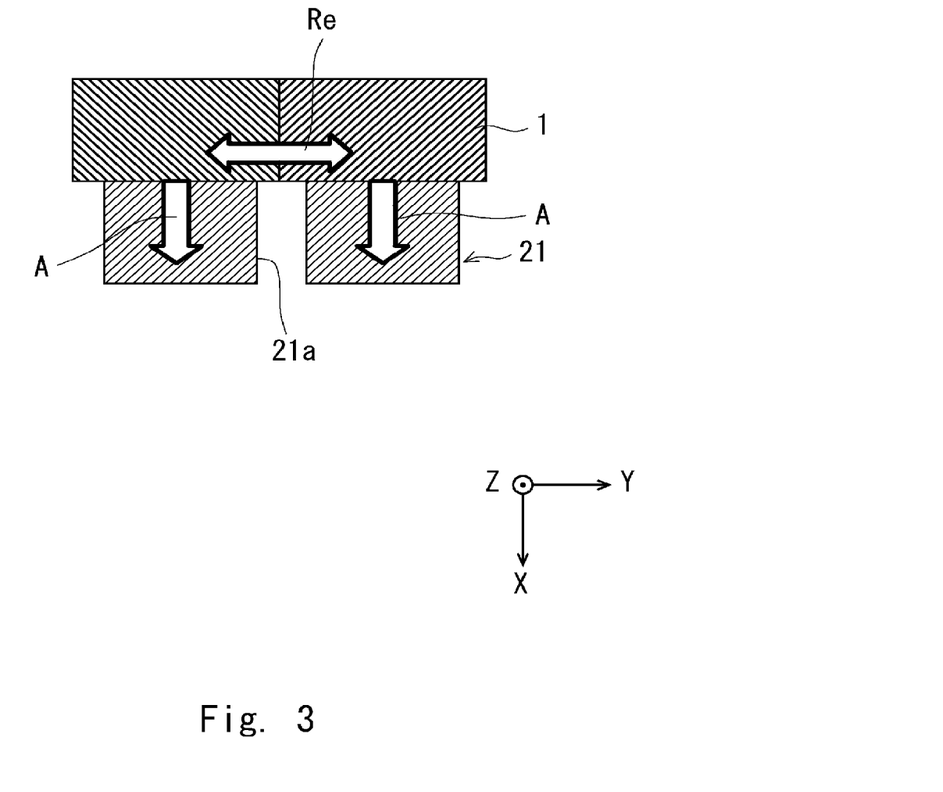
FIG. 3 is an XY cross-sectional view showing a force relationship among magnetized magnets and the magnet arrangement jig when the magnetized magnets are arranged on the magnet arrangement jig.

FIG. 1 is a perspective view showing a state in which a magnetized magnet to be newly arranged is being arranged on a magnet arrangement jig by the magnet arrangement method according to this embodiment. FIG. 2 is a diagram showing a state in which the magnetized magnet to be newly arranged has been arranged on the magnet arrangement jig by the magnet arrangement method according to this embodiment as viewed from the Z-axis positive side. FIG. 3 is an XY cross-sectional view showing a force relationship among magnetized magnets and the magnet arrangement jig when the magnetized magnets are arranged on the magnet arrangement jig.

For example, as shown in FIGS. 1 to 3, a magnetized magnet 1 has a quadrangular prism shape that is long in the Z-axis direction, and an N-pole part and an S-pole part are disposed so as to form a spiral magnetic flux loop R in the Z-axis direction.

However, the magnetized magnet 1 is not limited to having a quadrangular prism shape, and may instead have a cylinder shape or other polygonal cylinder shape. That is, the shape of the magnetized magnet 1 is not limited. Incidentally, in FIG. 1 etc., a part of the magnetic flux loop R is shown in a simplified manner.

A magnet arrangement jig 2 is made of a magnetic material and includes, for example, a first jig 21 and a second jig 22 as shown in FIGS. 1 to 3. The first jig 21 has, for example, a flat plate body substantially parallel to the YZ plane as its basic form. A surface of the first jig 21 on the X-axis negative side is an arrangement surface where the magnetized magnets 1 are arranged, and also functions as a guide surface for guiding the magnetized magnets 1 when they are arranged.

Groove parts 21a extending in the Z-axis direction are formed on the surface of the first jig 21 on the X-axis negative side. As shown in FIG. 2, the groove parts 21a are disposed at intervals in the Y-axis direction and so that they are positioned at boundaries of the magnetized magnets 1 adjacent to each other when the magnetized magnets 1 are arranged on the surface of the first jig 21 on the X-axis negative side. Therefore, the width dimension of the first jig 21 between the adjacent groove parts 21a in the Y-axis direction on the surface of the first jig 21 on the X-axis negative side is shorter than the width dimension of the magnetized magnet 1 in the Y-axis direction.

In this case, as shown in FIG. 3, the depth of the groove part 21a in the X-axis direction and the width dimension of the groove part 21a in the Y-axis direction may be a depth and a width dimension which can reduce a magnetic flux generated between the adjacent magnetized magnets 1 and in which an attraction force A of the magnetized magnet 1 acting on the surface of the first jig 21 on the X-axis negative side is larger than a repulsive force Re (or an attraction force) between the adjacent magnetized magnets 1. Further, the length of the groove part 21a in the Z-axis direction may be longer than the length of the magnetized magnet 1 in the Z-axis direction.

As shown in FIG. 1, the second jig 22 has a flat plate body substantially parallel to the XY plane and is disposed on the Z-axis negative side with regard to the first jig 21. Further, the second jig 22 protrudes from an end part of the first jig 21 on the Z-axis negative side to the X-axis negative side. A surface of the second jig 22 on the Z-axis positive side functions as a defining surface that determines positions of the magnetized magnets 1 on the Z-axis negative side upon end parts of the arranged magnetized magnets 1 on the Z-axis negative side coming into contact with the defining surface.

Figure 4:
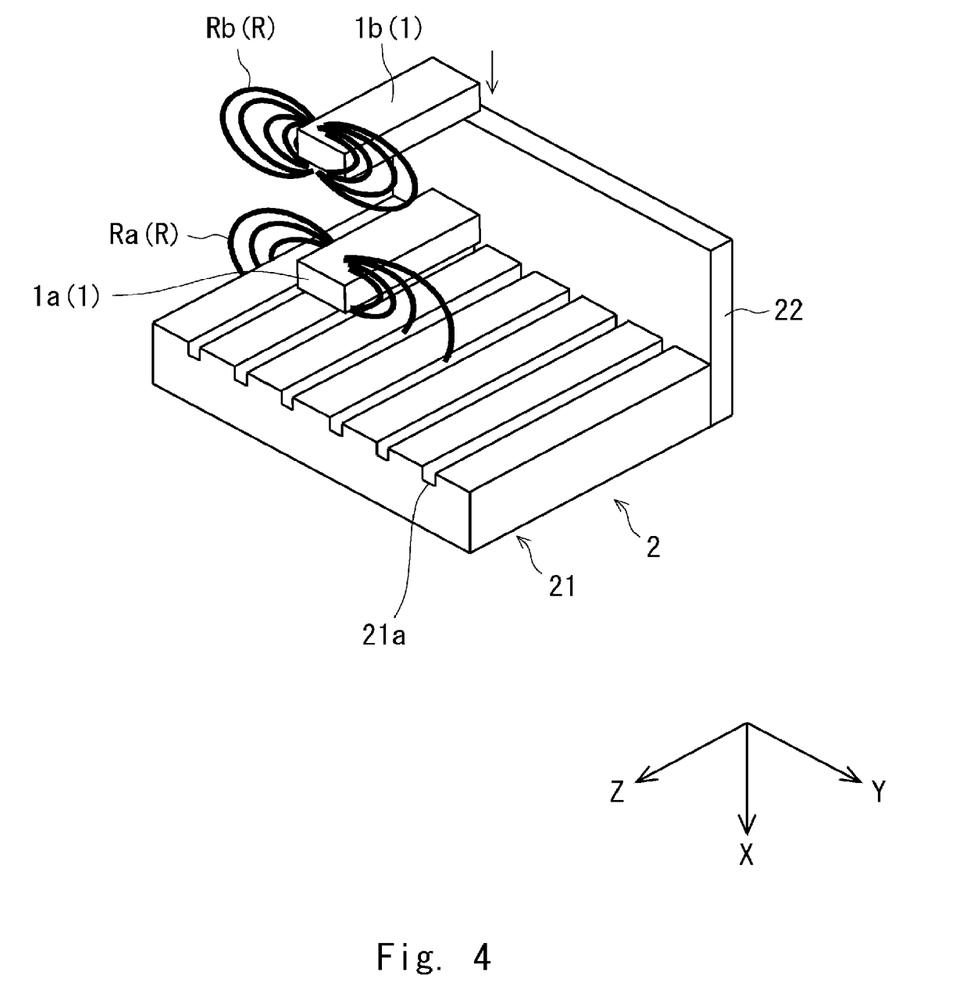
FIG. 4 is a diagram showing magnetic flux loops between the magnetized magnets when the magnetized magnet to be newly arranged is brought close to the already arranged magnetized magnet toward the X-axis positive side.

Next, a method for arranging the magnetized magnets 1 according to this embodiment will be described. Note that FIG. 4 is a diagram showing magnetic flux loops between the magnetized magnets when the magnetized magnet to be newly arranged is brought close to the already arranged magnetized magnet toward the X-axis positive side. Incidentally, in FIG. 4, like in the case of FIG. 1 etc., a part of the magnetic flux loop R is shown in a simplified manner.

Note that, in the following description, in order to clarify the description, the already arranged magnetized magnet may be denoted by a reference symbol $1a$, while the magnetized magnet to be newly arranged may be denoted by a reference symbol $1b$. Further, a magnetic flux loop of the already arranged magnetized magnet $1a$ may be denoted by a reference symbol Ra, while a magnetic flux loop of the magnetized magnet $1b$ to be newly arranged may be denoted by a reference symbol Rb.

As shown in FIG. 4, in a state in which the magnetized magnet $1a$ is arranged on the surface of the first jig 21 on the X-axis negative side, when the magnetized magnet $1b$ to be newly arranged is brought close to the already arranged magnetized magnet $1a$ toward the X-axis positive side, the magnetic flux loop Ra of the magnetized magnet $1a$ and the magnetic flux loop Rb of the magnetized magnet $1b$ repulse each other and it is thus difficult to arrange the magnetized magnet $1b$ to be newly arranged so that it is adjacent to the already arranged magnetized magnet $1a$ in the Y-axis direction.

Meanwhile, because of the characteristics of the magnetic flux loop, when the magnetized magnet $1b$ to be newly arranged is brought close to the already arranged magnetized magnet $1a$ toward the Z-axis negative side, which is the axial center direction of the magnetic flux loop Rb of the magnetized magnet $1b$ to be newly arranged, so that the magnetic flux loop Rb of the magnetized magnet $1b$ to be newly arranged overlaps the magnetic flux loop Ra of the already arranged magnetized magnet $1a$, the magnetized magnet $1b$ to be newly arranged is pulled into the Z-axis negative side by the magnetic flux loop Ra of the already arranged magnetized magnet $1a$ and the magnetic flux loop Rb of the magnetized magnet $1b$ to be newly arranged, whereby the magnetized magnet $1b$ to be newly arranged can be arranged so that it is adjacent to the already arranged magnetized magnet $1a$ in the Y-axis direction.

Therefore, in this embodiment, as shown in FIGS. 1 and 2, first, the surface of the magnetized magnet $1b$ to be newly arranged on the X-axis positive side is brought into contact with the surface of the first jig 21 of the magnet arrangement jig 2 on the X-axis negative side so as to be attracted thereto.

Then, in this state, the magnetized magnet $1b$ to be newly arranged is brought close to the already arranged magnetized magnet $1a$ toward the Z-axis negative side, which is the axial center direction of the magnetic flux loop Rb of the magnetized magnet $1b$ to be newly arranged, so that the magnetic flux loop Rb of the magnetized magnet $1b$ to be newly arranged overlaps the magnetic flux loop Ra of the already arranged magnetized magnet $1a$.

At this time, as shown in FIG. 1, a space, which is an end part of the magnet arrangement jig 2 on the Z-axis positive side and is located on the X-axis negative side with respect to the first jig 21, functions as an insertion part $2a$ into which the magnetized magnet $1b$ to be newly arranged is inserted. Incidentally, in FIG. 1, the insertion part $2a$ is shown by a dot-and-dash line (an imaginary line).

As a result, the magnetized magnet $1b$ to be newly arranged is pulled into the Z-axis negative side by the magnetic flux loop Ra of the already arranged magnetized magnet $1a$ and the magnetic flux loop Rb of the magnetized magnet $1b$ to be newly arranged, whereby the magnetized magnet $1b$ to be newly arranged can be arranged so that it is adjacent to the already arranged magnetized magnet $1a$ in the Y-axis direction.

As described above, the magnetized magnet $1b$ to be newly arranged can be pulled into the Z-axis negative side by the magnetic flux loop Ra of the already arranged magnetized magnet $1a$ and the magnetic flux loop Rb of the magnetized magnet $1b$ to be newly arranged so that the magnetized magnet $1b$ to be newly arranged is adjacent to the already arranged magnetized magnet $1a$.

Moreover, even when the groove part $21a$ is formed on the surface of the first jig 21 of the magnet arrangement jig 2 on the X-axis negative side, the groove part $21a$ is formed so that the attraction force A acting on the surface of the first jig 21 of the magnetized magnet 1 on the X-axis negative side is larger than the repulsive force Re (or the attraction force) between the adjacent magnetized magnets 1. Therefore, when the magnetized magnet $1b$ to be newly arranged is brought into contact with the first jig 21 so as to be attracted to the first jig 21, the attraction force becomes larger than the repulsive force or the attraction force between the adjacent magnetized magnets 1, whereby the magnetized magnet $1b$ to be newly arranged can be moved accurately to the Z-axis negative side.

Further, the magnetized magnet 1 can be moved by making the surface of the first jig 21 on the X-axis negative side function as a guide surface. By the above structures, the magnetized magnet $1b$ to be newly arranged can be arranged accurately at a determined position.

At this time, among the groove parts $21a$ formed on the surface of the first jig 21 of the magnet arrangement jig 2 on the X-axis negative side, the groove part $21a$ adjacent to the already arranged magnetized magnet $1a$ in the Y-axis direction may be used as a mark. Then, the magnetized magnet $1b$ to be newly arranged may be brought into contact with the surface of the first jig 21 on the X-axis negative side so as to be attracted thereto, and in this state, an end part of the magnetized magnet $1b$ to be newly arranged on the Z-axis negative side may be brought into contact with the second jig 22 by moving the magnetized magnet $1b$ to be newly arranged to the Z-axis negative side.

By doing the above, the magnetized magnets 1 can be arranged using the groove part $21a$ as a mark. Moreover, the groove part $21a$ can reduce the magnetic flux generated between the adjacent magnetized magnets 1. Further, the surface of the second jig 22 on the Z-axis positive side functions as a defining surface, whereby the positions of the end parts of the magnetized magnets 1 on the Z-axis negative side can be determined accurately. As a result, the magnetized magnet $1b$ to be newly arranged can be arranged accurately at the determined position.

Note that although the magnet arrangement jig 2 according to this embodiment includes the second jig 22, it may not include it. Further, the first jig 21 is not limited to having a flat plate body, and may instead be a cylindrical shape or the like. Further, the groove part $21a$ of the magnet arrangement jig 2 may be omitted. Further, the groove parts $21a$ of the magnet arrangement jig 2 are not limited to being disposed in all of the boundary parts of the adjacent magnetized magnets 1. That is, the groove parts $21a$ may be formed in the magnet arrangement jig 2 so that they are disposed in some of the boundary parts.

The magnet arrangement method according to this embodiment is suitably used, for example, when the magnetized magnets 1 are arranged in a Halbach array. However, the magnet arrangement method according to this embodiment can also be performed when the magnetized magnets 1 forming the spiral magnetic flux loops R in the Z-axis direction are arranged.

Second Embodiment

In this embodiment, a method for manufacturing a rotor using a principle of the above-described magnet arrangement method will be described. The method for manufacturing a rotor according to this embodiment is suitably used when a rotor of a radial gap type is manufactured.

Figure 5:
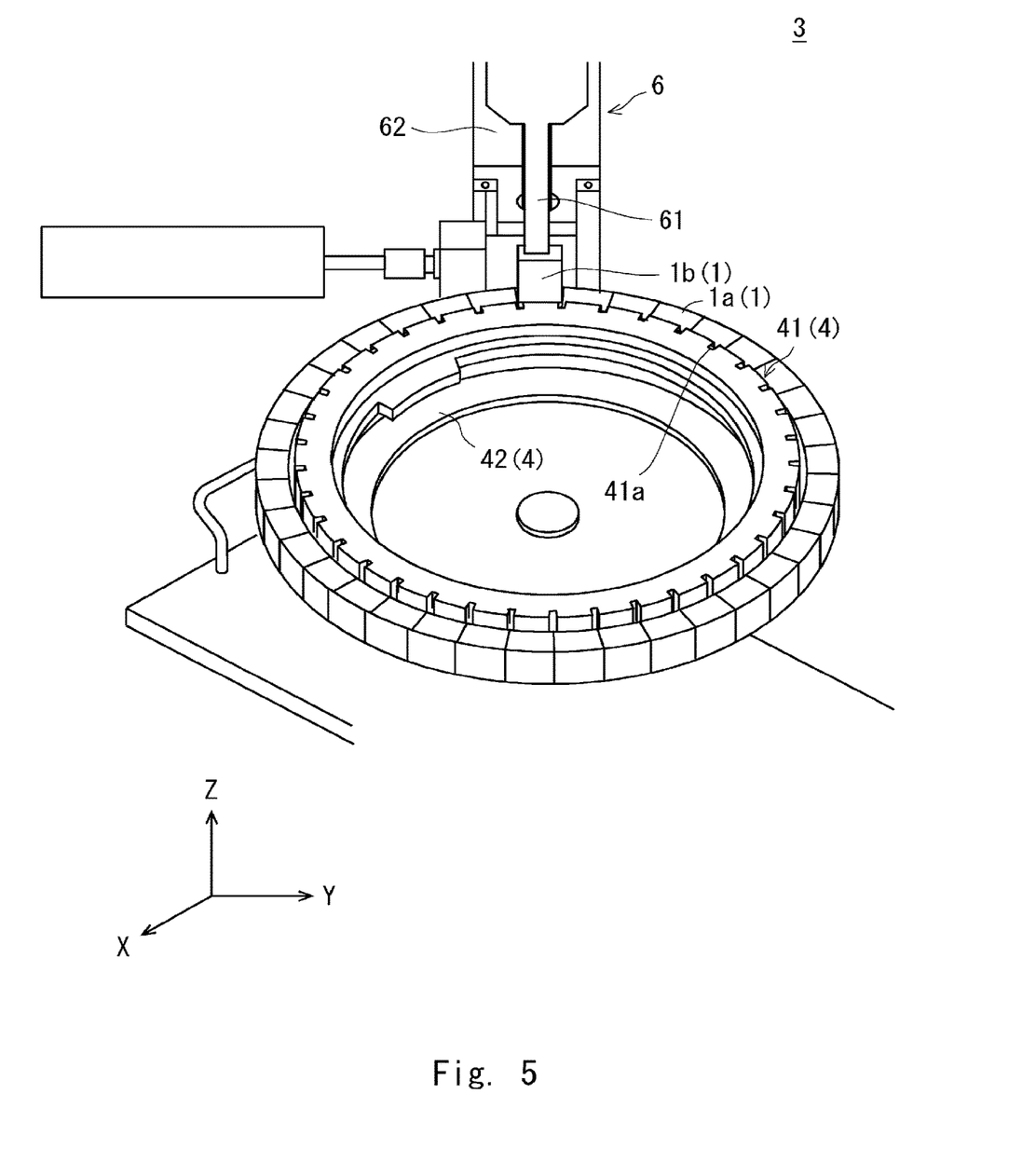
FIG. 5 is a diagram showing a state in which a magnetized magnet is being arranged using a magnet arrangement apparatus according to a second embodiment.
Figure 6:
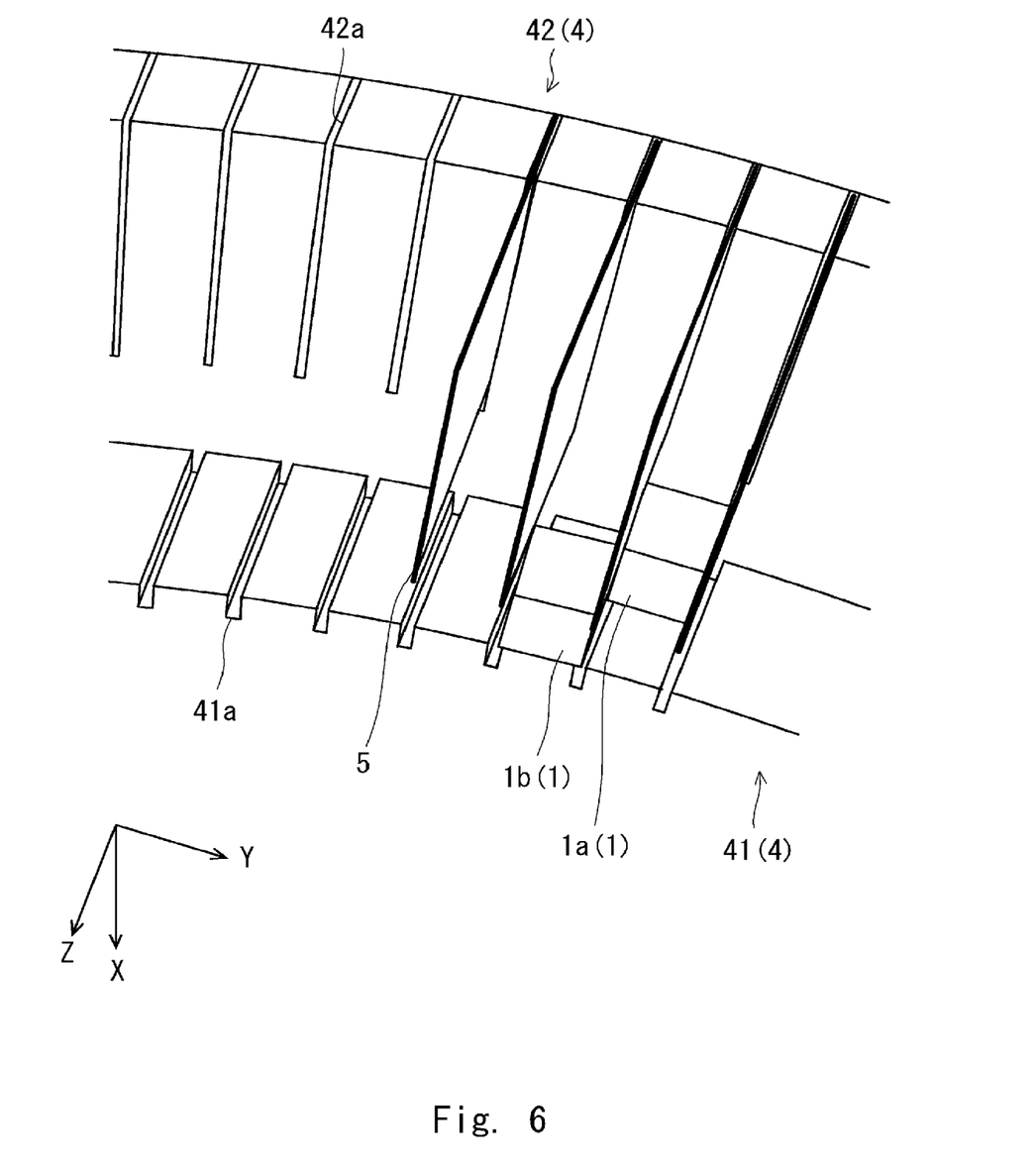
FIG. 6 is a perspective view of the state in which the magnetized magnet is being arranged as viewed from the Z-axis positive side.
Figure 7:
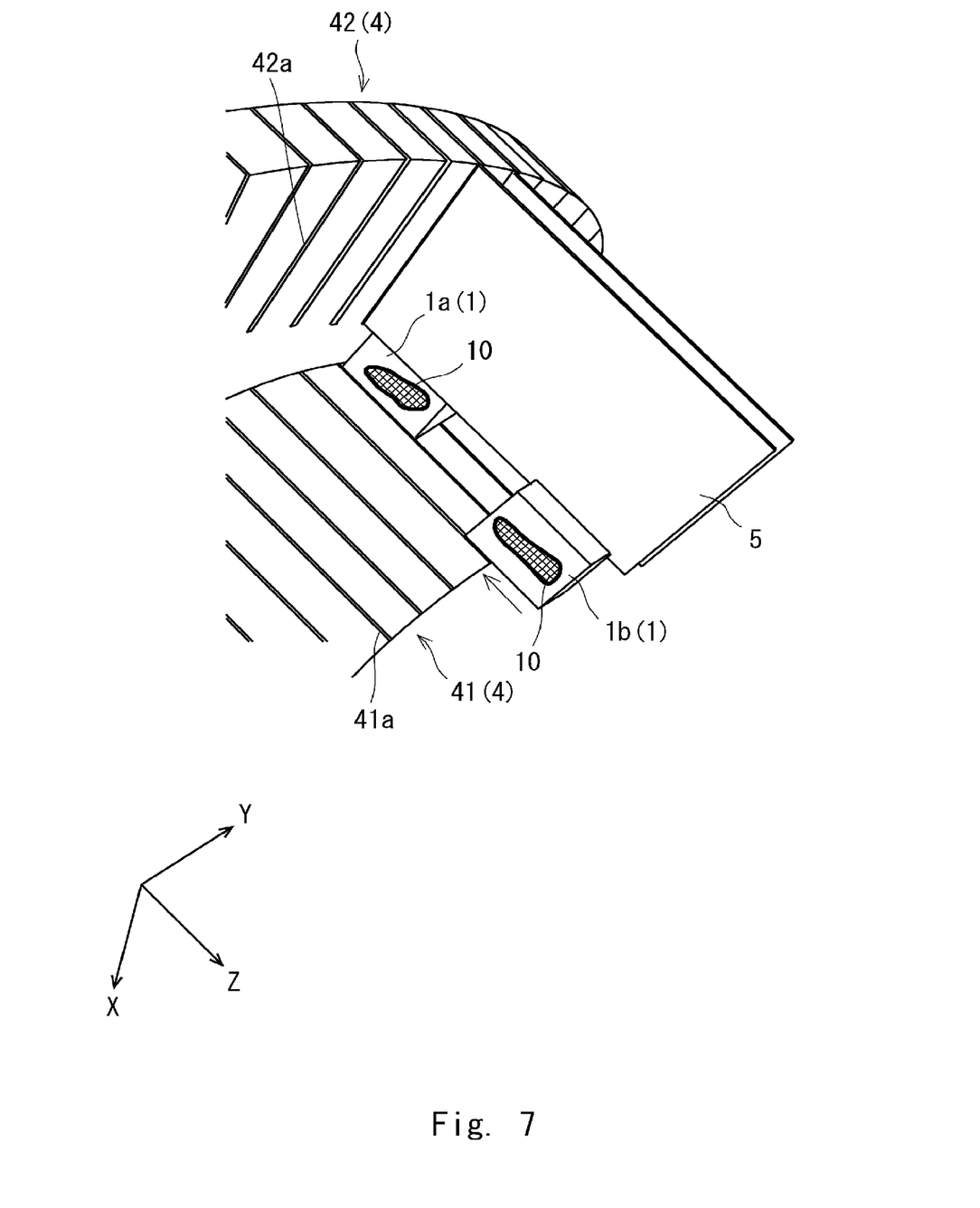
FIG. 7 is a diagram showing a state in which the magnetized magnet is brought into contact with a magnet arrangement jig as viewed from the Y-axis negative side.
Figure 8:
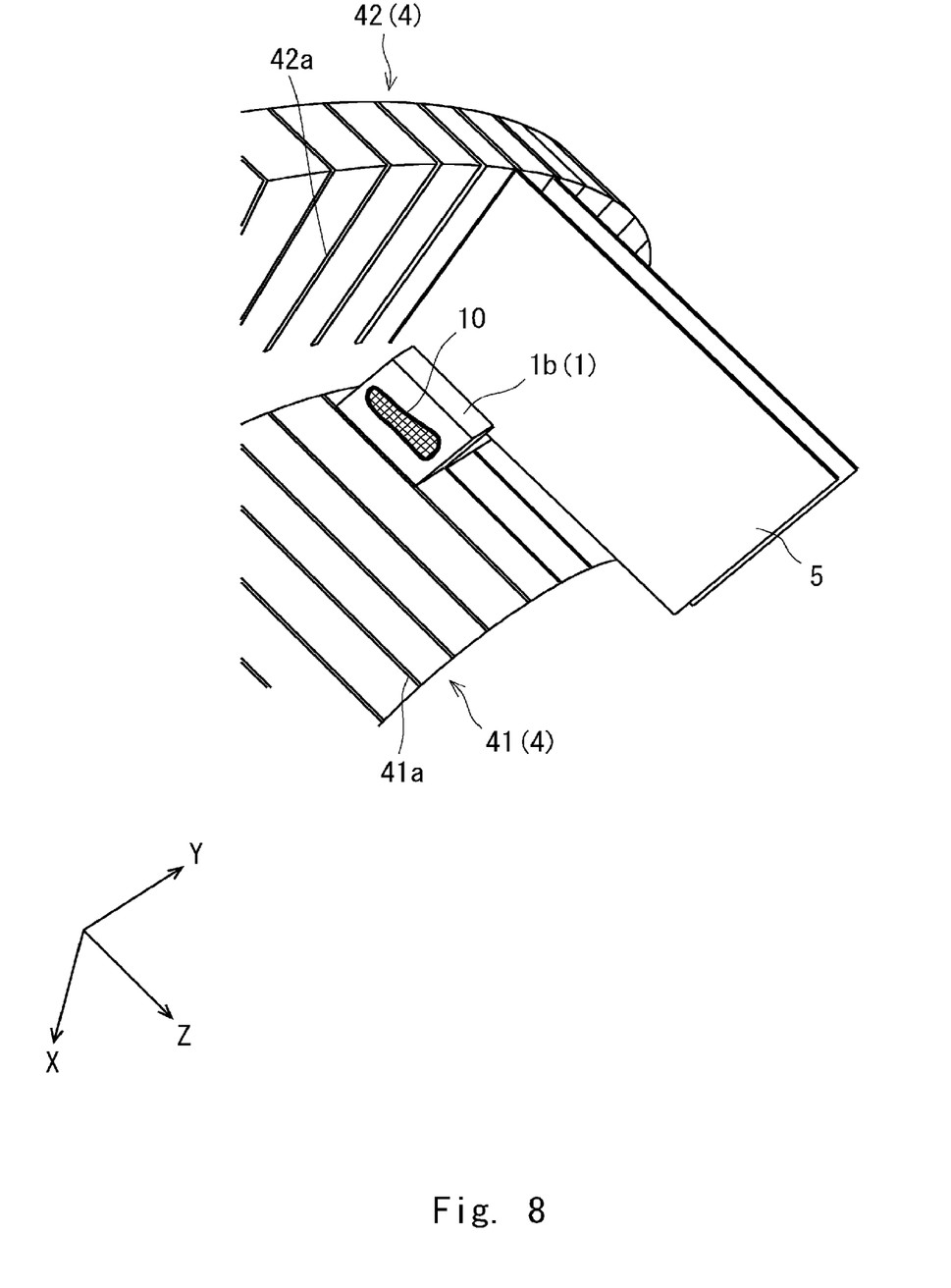
FIG. 8 is a diagram showing a state in which the magnetized magnet is arranged as viewed from the Y-axis negative side.

First, a configuration of a magnet arrangement apparatus used in the method for manufacturing a rotor according to this embodiment will be described. FIG. 5 is a diagram showing a state in which a magnetized magnet is being arranged using the magnet arrangement apparatus according to this embodiment. FIG. 6 is a perspective view of the state in which the magnetized magnet is being arranged as viewed from the Z-axis positive side. FIG. 7 is a diagram showing a state in which the magnetized magnet is brought into contact with a magnet arrangement jig as viewed from the Y-axis negative side. FIG. 8 is a diagram showing a state in which the magnetized magnet is arranged as viewed from the Y-axis negative side. Incidentally, in FIGS. 6 to 8, some of magnetized magnets to be newly arranged are extracted so as to clearly show them.

A magnet arrangement apparatus 3 includes a magnet arrangement jig 4, partition plates 5, and a magnet insertion apparatus 6 as shown in FIGS. 5 to 8. The magnet arrangement jig 4 is composed of a magnetic material and includes a first jig 41 and a second jig 42 as shown in FIG. 6 etc.

The first jig 41 has a cylindrical shape as its basic form, and the central axis of the first jig 41 is disposed substantially in parallel with the Z axis. An outer peripheral surface of the first jig 41 serves as an arrangement surface where the magnetized magnets 1 are arranged, and also functions as a guide surface for guiding the magnetized magnets 1 when they are arranged. Groove parts 41a extending in the Z-axis direction are formed on the outer peripheral surface of the first jig 41.

The groove parts 41a are disposed at intervals in the circumferential direction of the first jig 41 and so that when the magnetized magnets 1 are arranged on the outer peripheral surface of the first jig 41, they are positioned at boundaries of the magnetized magnets 1 adjacent to each other. Therefore, the width dimension of the first jig 41 between the adjacent groove parts 41a on the outer peripheral surface of the first jig 41 is shorter than the width dimension of the magnetized magnet 1. Note that the groove parts 41a are not limited to being disposed in all of the boundary parts of the adjacent magnetized magnets 1. That is, the groove parts 41a may be formed in the first jig 41 so that they are disposed in some of the boundary parts.

In this case, the depth of the groove part 41a in the radial direction of the first jig 41 and the width dimension of the groove part 41a in the circumferential direction of the first jig 41 may be a depth and a width dimension which can reduce a magnetic flux generated between the adjacent magnetized magnets 1 and in which an attraction force of the magnetized magnet 1 acting on the outer peripheral surface of the first jig 41 is larger than a repulsive force or an attraction force between the adjacent magnetized magnets 1. Further, the length of the groove part 41a in the Z-axis direction may be longer than the length of the magnetized magnet 1 in the Z-axis direction.

As shown in FIG. 6 etc., the second jig 42 has an annular shape as its basic shape and is disposed substantially in parallel with the XY plane. Further, the second jig 42 protrudes from an end part of the first jig 41 on the Z-axis negative side toward the outer side of the first jig 41 in the radial direction. A surface of the second jig 42 on the Z-axis positive side functions as a defining surface that determines positions of the magnetized magnets 1 on the Z-axis negative side upon end parts of the arranged magnetized magnets 1 on the Z-axis negative side coming into contact with the defining surface.

Groove parts 42a extending in the radial direction of the second jig 42 is formed on the surface of the second jig 42 on the Z-axis positive side. The groove parts 42a are disposed in the radial direction of the first jig 41 on a line along which the groove parts 41a of the first jig 41 are arranged when viewed from the Z-axis direction.

At this time, for example, as shown in FIG. 6 etc., the groove parts 42a are arranged on the outer part of the second jig 42 in the radial direction. That is, the inner part of the groove part 42a in the radial direction of the second jig 42 does not reach the groove part 41a of the first jig 41. The width dimension of the groove part 42a in the circumferential direction of the second jig 42 is substantially equal to the thickness of the partition plate 5 so that the partition plate 5 can be held.

The magnet arrangement jig 4 described above may be able to be rotated around the central axis of the first jig 41 by a driving mechanism (not shown).

The partition plates 5 are disposed between the adjacent magnetized magnets 1 in order to arrange the magnetized magnets 1 in a cylindrical shape. The partition plate 5 has a flat plate body made of a non-magnetic material and is fixed in a state in which it is inserted into the groove part 42a of the second jig 42.

The magnet insertion apparatus 6 is configured to move the held magnetized magnet 1 in the Z-axis direction. That is, as shown in FIG. 5, the magnet insertion apparatus 6 includes a holding part 61 for holding the magnetized magnet 1 and a driving mechanism 62 for moving the holding part 61 in the Z-axis direction.

Next, a flow in which a rotor is manufactured using the magnet arrangement apparatus 3 having the above configuration will be described. First, the holding part 61 is moved to the Z-axis negative side while the magnetized magnet 1b to be newly arranged is held by the holding part 61 of the magnet insertion apparatus 6, and as shown in FIGS. 6 and 7, the magnetized magnet 1b is brought into contact with the outer peripheral surface of the first jig 41 so as to be attracted thereto.

At this time, as shown in FIG. 7, an adhesive 10 is applied to the side of the magnetized magnet 1b to be newly arranged opposite to the side of the already arranged magnetized magnet 1a. Therefore, the adhesive 10 is also applied to the side of the already arranged magnetized magnet 1a on which a new magnetized magnet is arranged.

Next, the holding part 61 of the magnet insertion apparatus 6 is moved to the Z-axis negative side so that the magnetic flux loop of the magnetized magnet 1b to be newly arranged overlaps the magnetic flux loop of the already arranged magnetized magnet 1a. Then, as shown in FIG. 8, the magnetized magnet 1b to be newly arranged is moved to the axial center direction of the magnetic flux loop of the magnetized magnet 1b to be newly arranged, and an end part of the magnetized magnet 1b to be newly arranged on the Z-axis negative side is brought into contact with the surface of the second jig 42 on the Z-axis positive side.

At this time, like in the case of the first embodiment, the magnetized magnet 1b to be newly arranged is pulled into the Z-axis negative side by the magnetic flux loop of the already arranged magnetized magnet 1a and the magnetic flux loop of the magnetized magnet 1b to be newly arranged.

As a result, the magnetized magnet 1b to be newly arranged can be arranged so that it is adjacent to the already arranged magnetized magnet 1a.

Then, in a gap between the already arranged magnetized magnet 1a and the magnetized magnet 1b to be newly arranged, the partition plate 5 is disposed on the outer part of the first jig 41 of the magnet arrangement jig 4 in the radial direction. By this structure, the magnetized magnets 1 can be arranged in a desired arc shape when viewed from the Z-axis direction. Note that a thickness and a shape (e.g., a triangular shape) of the partition plate 5 can be designed in accordance with the radius of the magnetized magnet 1 to be arranged.

Further, since the adhesive 10 has been applied to the side surface of the already arranged magnetized magnet 1a, when the magnetized magnet 1b to be newly arranged is arranged so that it is adjacent to the already arranged magnetized magnet 1a, the magnetized magnet 1b to be newly arranged can be joined to the already arranged magnetized magnet 1a.

When the process of arranging the magnetized magnet 1b to be newly arranged is repeated while rotating the magnet arrangement jig 4, the magnetized magnets 1 can be arranged in a cylindrical shape. Then, the magnetized magnets 1 arranged in a cylindrical shape are moved to the Z-axis positive side with respect to the magnet arrangement jig 4 so that they are taken out from the magnet arrangement jig 4, and the magnetized magnets 1 and a rotation shaft are attached to a rotor core (not shown) while the magnetized magnets 1 being fixed to the rotor core, whereby a rotor can be formed. In this case, the rotor may be either an inner rotor or an outer rotor.

In the magnet arrangement method, the method for manufacturing a rotor, and the magnet arrangement apparatus 3 described above, like in the case of the first embodiment, the magnetized magnet 1b to be newly arranged is pulled into the Z-axis negative side by the magnetic flux loop of the already arranged magnetized magnet 1a and the magnetic flux loop of the magnetized magnet 1b to be newly arranged so that the magnetized magnet 1b to be newly arranged is adjacent to the already arranged magnetized magnet 1a.

Moreover, even when the groove part 41a is formed on the outer peripheral surface of the first jig 41 of the magnet arrangement jig 4, the groove part 41a is formed so that the attraction force acting on the outer peripheral surface of the first jig 41 of the magnetized magnet 1 is larger than the repulsive force or the attraction force between the adjacent magnetized magnets 1. Therefore, when the magnetized magnet 1b to be newly arranged is brought into contact with the first jig 41 so as to be attracted thereto, the attraction force becomes larger than the repulsive force or the attraction force between the adjacent magnetized magnets 1, whereby the magnetized magnet 1b to be newly arranged can be moved accurately to the Z-axis negative side.

Further, the outer peripheral surface of the first jig 41 can function as a guide surface to move the magnetized magnet 1b to be newly arranged. By the above structures, the magnetized magnet 1b to be newly arranged can be arranged accurately at a determined position.

Note that, although the magnet arrangement apparatus 3 according to this embodiment is configured so that the magnet arrangement jig 4 is rotated around the central axis of the first jig 41, it may instead be configured so that the magnet insertion apparatus 6 is rotated around the central axis of the first jig 41. In short, the magnet arrangement apparatus 3 may be configured so that at least one of the magnet arrangement jig 4 and the magnet insertion apparatus 6 is rotated around the central axis of the first jig 41.

Third Embodiment

Figure 9:
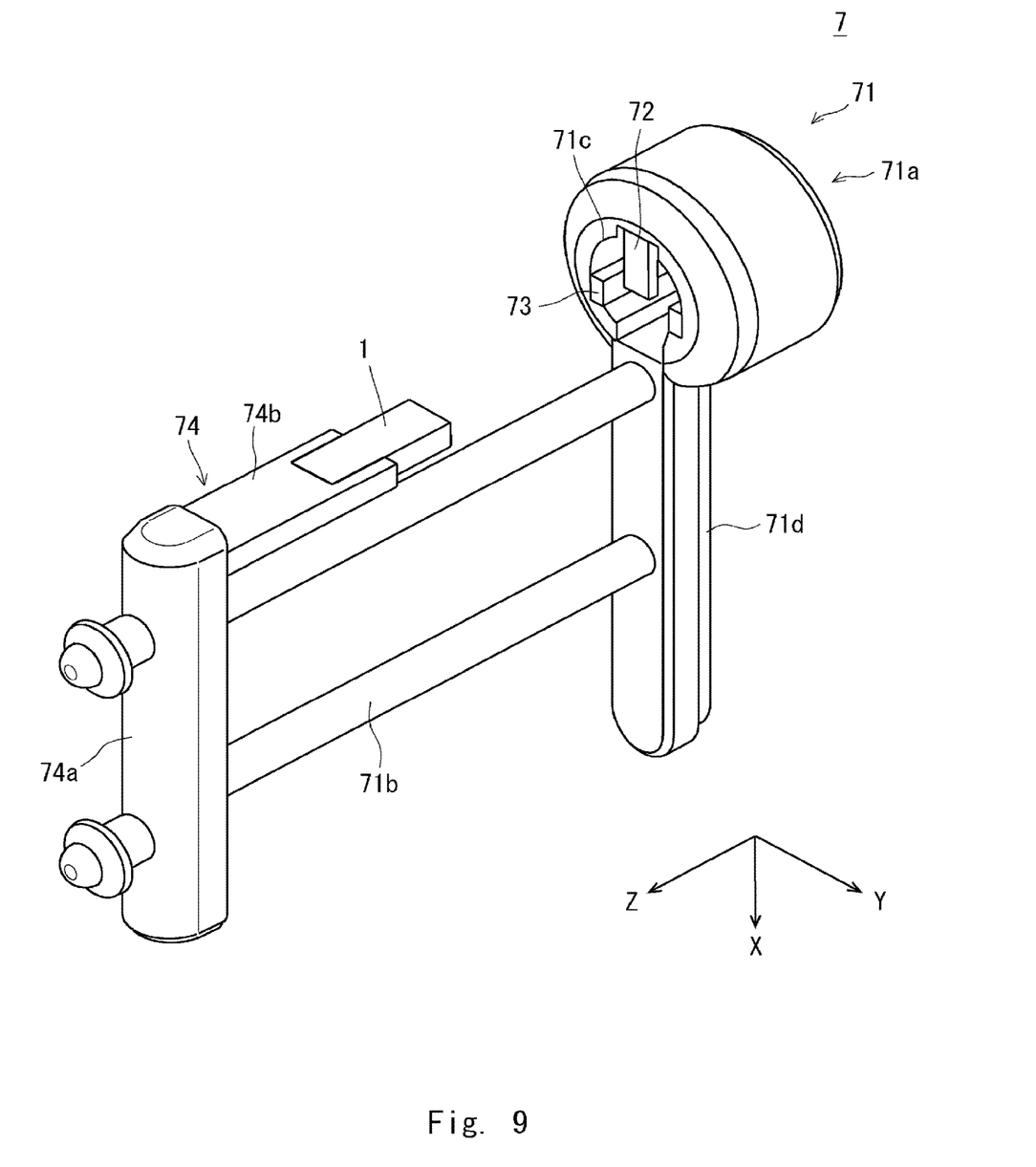
FIG. 9 is a perspective view of a magnet induction apparatus according to a third embodiment.

In this embodiment, a magnet induction apparatus using the principle of the above-described magnet arrangement method will be described. First, a configuration of the magnet induction apparatus according to this embodiment will be described. The magnet induction apparatus according to this embodiment is suitably used when a magnetized magnet is disposed in a magnetic material such as a rotor core. FIG. 9 is a perspective view showing the magnet induction apparatus according to this embodiment.

As shown in FIG. 9, a magnet induction apparatus 7 includes a runner 71, a guide part 72, induction magnets 73, and a pushing part 74. The runner 71 is made of a non-magnetic material and includes an insertion part 71a and rails 71b.

The insertion part 71a has a cylindrical shape, including a penetration part 71c that penetrates the insertion part 71a in the Z-axis direction. The rails 71b are extended in the Z-axis direction and disposed in the X-axis direction so that they are spaced apart from each other. End parts of the rails 71b on the Z-axis negative side are fixed to a fixing part 71d that protrudes from the insertion part 71a to the X-axis positive side.

The guide part 72 is a magnetic material extending in the Z-axis direction and is fixed to a part of the penetration part 71c of the insertion part 71a on the X-axis positive side. At this time, a surface of the guide part 72 on the X-axis positive side may be disposed substantially in parallel with the YZ plane.

The induction magnets 73 have, for example, substantially quadrangular prism shapes that are long in the Z-axis direction and are disposed on both sides of the guide part 72 in the Y-axis direction when viewed from the Z-axis direction. In other words, the induction magnets 73 are disposed on both sides of the guide part 72 so that they sandwich the guide part 72 when viewed from the X-axis direction.

The induction magnets 73 are fixed to a part of the penetration part 71c of the insertion part 71a on the Y-axis positive side and a part of the penetration part 71c of the insertion part 71a on the Y-axis negative side. The axial centers of the magnetic flux loops of the above induction magnets 73 are substantially parallel to the Z axis. However, the induction magnet 73 is not limited to having a quadrangular prism shape, and may instead have a cylinder shape or other polygonal cylinder shape. That is, the shape of the induction magnet 73 is not limited.

The pushing part 74 includes a slider 74a and a holding part 74b. The rail 71b is inserted into the slider 74a in the Z-axis direction, and the slider 74a is movable along the rail 71b. The holding part 74b protrudes from an end part of the slider 74a on the X-axis negative side to the Z-axis negative side, and includes a mechanism capable of holding the magnetized magnet 1 at an end part of the holding part 74b on the Z-axis negative side.

Figure 10:
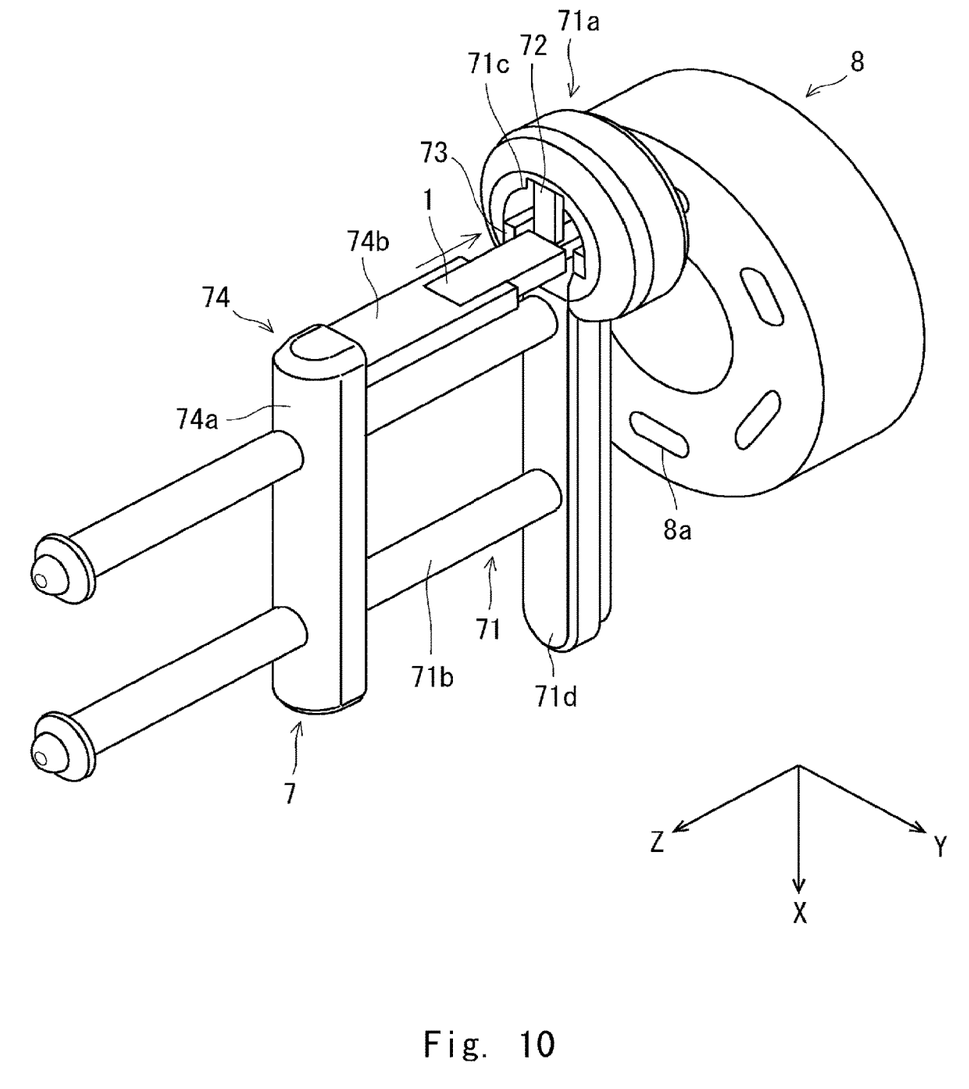
FIG. 10 is a perspective view showing a state in which a magnetized magnet is being inserted into an insertion part of a rotor core by using the magnet induction apparatus according to the third embodiment.
Figure 11:
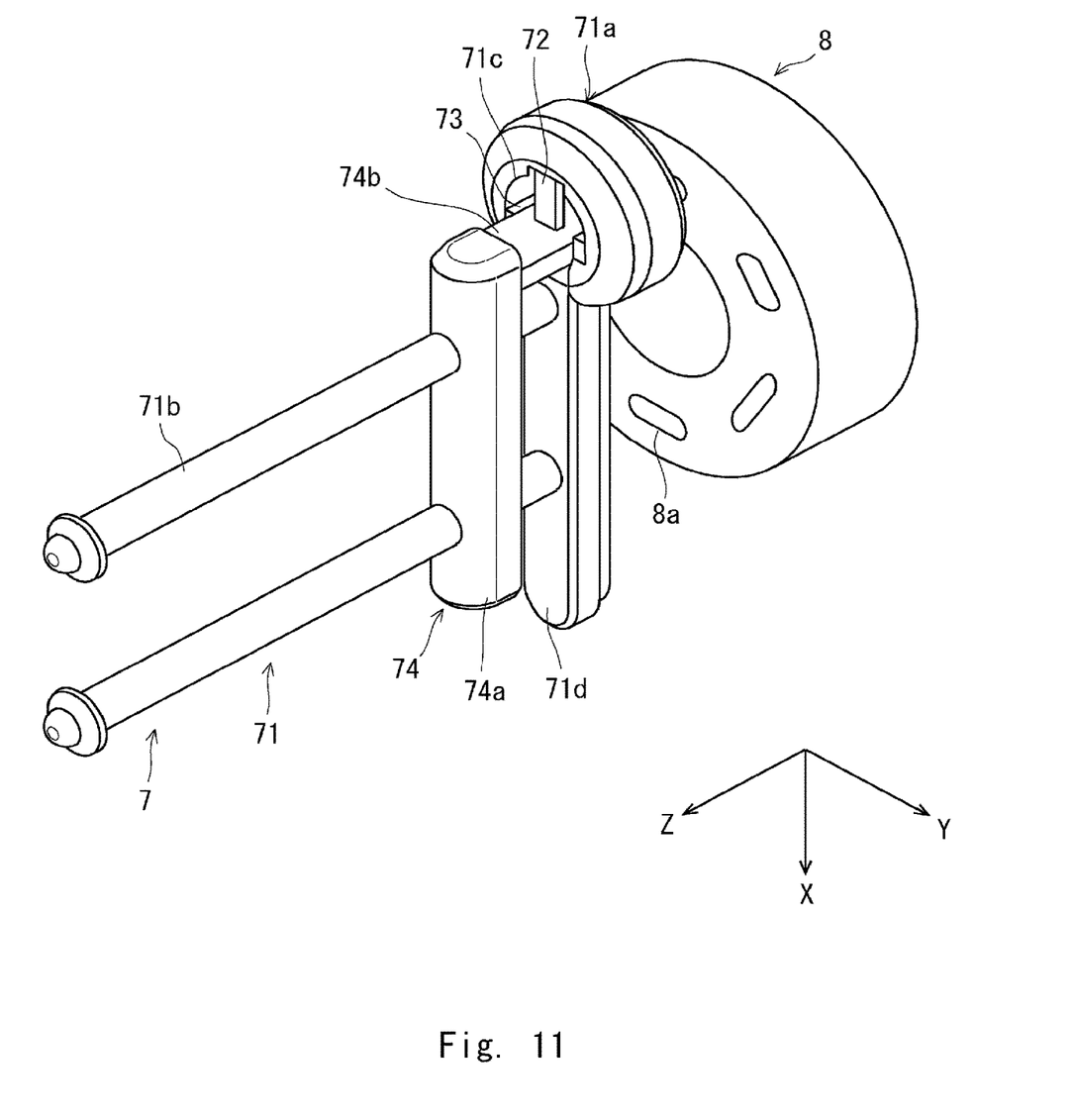
FIG. 11 is a perspective view showing a state in which the magnetized magnet has been inserted into the insertion part of the rotor core by using the magnet induction apparatus according to the third embodiment.

Next, a flow in which a magnetized magnet is inserted into an insertion part of a rotor core using the magnet induction apparatus according to this embodiment will be described. FIG. 10 is a perspective view showing a state in which the magnetized magnet is being inserted into an insertion part of a rotor core by using the magnet induction apparatus according to this embodiment. FIG. 11 is a perspective view showing a state in which the magnetized magnet has been inserted into the insertion part of the rotor core by using the magnet induction apparatus according to this embodiment.

First, an insertion part 8a formed in a rotor core 8 is disposed so that it overlaps the insertion part 71a of the runner 71 in the Z-axis direction. Then, as shown in FIG. 10, the magnetized magnet 1 is held by the holding part 74b of the pushing part 74.

Next, the pushing part 74 is moved along the rail 71b to the Z-axis negative side, and the magnetized magnet 1 is inserted inside the insertion part 71a. At this time, the magnetized magnet 1 is inserted inside the insertion part 71a so that the surface of the magnetized magnet 1 on the X-axis negative side substantially comes into surface contact with the surface of the guide part 72 on the X-axis positive side.

Further, while maintaining a state in which the surface of the magnetized magnet 1 on the X-axis negative side is substantially in surface contact with the surface of the guide part 72 on the X-axis positive side, the magnetized magnet 1 is pushed by the pushing part 74 until the magnetized magnet 1 is inserted into the insertion part 8a of the rotor core 8, and then the holding of the magnetized magnet 1 by the holding part 74b of the pushing part 74 is released.

At this time, the magnetized magnet 1 is pushed in the axial center direction of the magnetic flux loop of the magnetized magnet 1 so that the magnetic flux loop of the magnetized magnet 1 overlaps the magnetic flux loops of the induction magnets 73, and, like in the case of the first embodiment, the magnetized magnet 1 is pulled to the Z-axis negative side by the magnetic flux loop of the magnetized magnet 1 and the magnetic flux loops of the induction magnets 73, and is induced to the insertion part 8a of the rotor core 8. That is, the induction magnets 73 induce the magnetized magnet 1 by magnetic forces of the induction magnets 73.

As described above, the magnet induction apparatus 7 according to this embodiment can induce the magnetized magnet 1 to the Z-axis negative side by the magnetic flux loop of the magnetized magnet 1 and the magnetic flux loops of the induction magnets 73 using the principle of the first embodiment. Moreover, the magnetized magnet 1 can be moved by making the surface of the guide part 72 on the X-axis negative side function as a guide surface. As a result, the magnetized magnet 1 can be easily induced accurately to a determined position.

Note that, in this embodiment, although the induction magnets 73 are disposed on both sides of the guide part 72 in the Y-axis direction when viewed from the Z-axis direction, the induction magnet 73 may be disposed on at least one side of the guide part 72. However, when the induction magnets 73 are disposed on both sides of the guide part 72, it is possible to make a position control of the magnetized magnet 1 in the Y-axis direction stable.

Further, in this embodiment, although the magnetized magnet 1 is inserted into the insertion part 8a of the rotor core 8 as an embedded magnet, a process similar to this process can be performed when the magnetized magnets 1 are arranged on the inner or outer peripheral surface of the rotor core using the magnet induction apparatus 7.

The present disclosure is not limited to the above-described embodiments and may be changed as appropriate without departing from the scope and spirit of the present disclosure.

This application is based upon and claims the benefit of priority from Japanese patent application No. 2021-44583, filed on Mar. 18, 2021, the disclosure of which is incorporated herein in its entirety by reference.

REFERENCE SIGNS LIST

1 MAGNETIZED MAGNET
1a ALREADY ARRANGED MAGNETIZED MAGNET
1b MAGNETIZED MAGNET TO BE NEWLY ARRANGED
2 MAGNET ARRANGEMENT JIG
2a INSERTION PART
21 FIRST JIG
21a GROOVE PART
22 SECOND JIG
3 MAGNET ARRANGEMENT APPARATUS
4 MAGNET ARRANGEMENT JIG
41 FIRST JIG
41a GROOVE PART
42 SECOND JIG
42a GROOVE PART
5 PARTITION PLATE
6 MAGNET INSERTION APPARATUS
61 HOLDING PART
62 DRIVING MECHANISM
10 ADHESIVE
7 MAGNET INDUCTION APPARATUS
71 RUNNER
71a INSERTION PART
71b RAIL
71c PENETRATION PART
71d FIXING PART
72 GUIDE PART
73 INDUCTION MAGNET
74 PUSHING PART
74a SLIDER
74b HOLDING PART
8 ROTOR CORE
8a INSERTION PART
A ATTRACTION FORCE
R MAGNETIC FLUX LOOP
Ra MAGNETIC FLUX LOOP OF ALREADY ARRANGED MAGNETIZED MAGNET
Rb MAGNETIC FLUX LOOP OF MAGNETIZED MAGNET TO BE NEWLY ARRANGED
Re REPULSIVE FORCE

The invention claimed is:

1. A magnet arrangement method for arranging a plurality of magnetized magnets, the magnet arrangement method comprising an arrangement process of arranging the plurality of magnetized magnets in a magnet arrangement jig composed of a magnetic material,
wherein in the arrangement process, in a state where a magnetized magnet to be newly arranged is brought into contact with the magnet arrangement jig so as to be attracted to the magnet arrangement jig, the magnetized magnet to be newly arranged is moved in an axial center direction of a magnetic flux loop of the magnetized magnet to be newly arranged so that the magnetic flux loop of the magnetized magnet to be newly arranged overlaps a magnetic flux loop of a magnetized magnet that has already been arranged in the magnet arrangement jig, whereby the magnetized magnet to be newly arranged is positioned so as to be adjacent to the already arranged magnetized magnet.

2. The magnet arrangement method according to claim 1, wherein
groove parts are formed in the magnet arrangement jig, and
the magnetized magnet to be newly arranged is arranged so that the groove parts are disposed at boundary parts of the magnetized magnets adjacent to each other when the magnetized magnets are arranged.

3. A method for manufacturing a rotor, the method comprising the magnet arrangement method according to claim 1.

4. A magnet arrangement jig used to arrange magnetized magnets, the magnet arrangement jig comprising a first jig composed of a magnetic material, wherein
the magnetized magnets are arranged on a surface of the first jig, the surface of the first jig including groove parts disposed at boundary parts of the magnetized magnets adjacent to each other when the magnetized magnets are arranged, and
the magnet arrangement jig comprises, on a side of one end part of the magnet arrangement jig in a direction in which the groove parts are extended, an insertion part into which the magnetized magnets are inserted in order to arrange the magnetized magnets on the surface of the first jig.

5. The magnet arrangement jig according to claim 4, comprising a second jig composed of a magnetic material, wherein
the second jig is disposed on a side of an other end part of the first jig in a direction in which the groove parts are extended relative to the first jig, and
the second jig protrudes from a surface on a side of the first jig where the groove parts are formed so that the second jig comes into contact with end parts of the magnetized magnets on an insertion direction side of the magnetized magnets.

6. A magnet induction apparatus configured to induce a magnetized magnet, the magnet induction apparatus comprising:
an insertion part into which the magnetized magnet is inserted;
a guide part configured to guide the magnetized magnet, the guide part being provided in the insertion part;
induction magnets configured to induce the magnetized magnet by a magnetic force, the induction magnets being provided in the insertion part; and
a pushing part configured to push the magnetized magnet in an axial center direction of a magnetic flux loop of the magnetized magnet so that the magnetic flux loop of the magnetized magnet overlaps magnetic flux loops of the induction magnets,
wherein the magnetized magnet is inserted into the insertion part where the guide part and the induction magnets are provided.

7. The magnet induction apparatus according to claim 6, wherein the induction magnets are disposed on both sides of the guide part when viewed in a direction in which the magnetized magnet is pushed.

* * * * *